US006189387B1

(12) United States Patent
Tani et al.

(10) Patent No.: US 6,189,387 B1
(45) Date of Patent: Feb. 20, 2001

(54) METHOD OF DETECTING OVERCOATING RUBBER FLOWED IN SPACE BETWEEN CORE MEMBER AND SECURING METAL FITTING OF POLYMER INSULATOR

(75) Inventors: Takao Tani, Ama-Gun; Tomio Suzuki, Yokkaichi, both of (JP)

(73) Assignee: NGK Insulators, Ltd., Nagoya (JP)

( * ) Notice: Under 35 U.S.C. 154(b), the term of this patent shall be extended for 0 days.

(21) Appl. No.: 09/223,291

(22) Filed: Dec. 30, 1998

(30) Foreign Application Priority Data

Jan. 12, 1998 (JP) ........................................ 10-003949

(51) Int. Cl.[7] ........................................ G01N 3/22
(52) U.S. Cl. ........................................ 73/847; 73/862.08
(58) Field of Search ........................................ 73/847, 862.08, 73/865.8; 428/334, 493

(56) References Cited

U.S. PATENT DOCUMENTS 5,059,486 * 10/1991 Maronian et al. .................. 428/493
5,093,203 * 3/1992 Mowrey et al. .................. 428/462
5,162,156 * 11/1992 Troughton, Jr. et al. .......... 428/460
5,804,299 * 9/1998 Nakata et al. .................. 428/334

* cited by examiner

*Primary Examiner*—Max Noori
(74) *Attorney, Agent, or Firm*—Burr & Brown

(57) ABSTRACT

A method of detecting an overcoating rubber flowed in a space between a core member and a securing metal fitting of a polymer insulator having the core member, the overcoating arranged around the core member and the securing metal fitting fixed to at least one end of the core member, is disclosed. The method includes the steps of: applying a torque in a circumferential direction to the securing metal fitting, after forming the overcoating rubber but before fixing the securing metal fitting to the core member; deforming an index provided on a surface of the overcoating; and detecting whether the overcoating rubber is existent or not in the space between the securing metal member and the core member in response to a deforming extent indicated by the index.

5 Claims, 5 Drawing Sheets

METHOD OF DETECTING OVERCOATING RUBBER FLOWED IN SPACE BETWEEN CORE MEMBER AND SECURING METAL FITTING OF POLYMER INSULATOR

BACKGROUND OF THE INVENTION

1. Field of the Invention

The present invention relates to a method of detecting an overcoating rubber flowed in a space between a core member and a securing metal fitting of a polymer insulator having the core member, the overcoating arranged around the core member and the securing metal fitting fixed to at least one end of the core member.

2. Description of the Related Art

Generally, there is known a polymer insulator comprising a core member, overcoating arranged around the core member, and securing metal fitting fixed to at least one end of the core member. In order to keep a seal performance between the securing metal fitting and the overcoating, when such a polymer insulator is manufactured, the applicant proposed, in Japanese Patent Application No. 9-56297, a method of manufacturing the polymer insulator, in which an overcoating rubber for forming the overcoating is formed under a condition such that the securing metal fitting is set to the core member without being fixed, the securing metal fitting and the overcoating rubber are preliminarily cured, and the securing metal fitting is clamped to the core member.

In the manufacturing method mentioned above, since the securing metal fitting is simply set to the core member, in the case of forming the overcoating rubber, a V-packing is arranged in the space between the core member and the securing metal fitting, thereby preventing a flow of the overcoating rubber into the space. However, if the overcoating rubber should flow into the space between the core member and the securing metal fitting, the tensile strength of the polymer insulator is decreased. Therefore, it is necessary to detect whether the overcoating rubber has flowed into the space or not by a non-destructive manner.

As a non-destructive detection methods, there are X-rays, an ultrasonic flaw detection method, a method using acoustic emission, and so on. However, in the case of detecting whether or not the overcoating rubber which is flowed into the space between the core member and the securing metal fitting, as existent, it is not possible to detect the overcoating rubber in the space by the method of using X-ray, the ultrasonic flaw detection method and the method of using acoustic emission.

SUMMARY OF THE INVENTION

It is an object of the present invention to eliminate the drawbacks mentioned above and to provide a method of detecting an overcoating rubber of a polymer insulator which can detect whether or not the overcoating rubber is existent in a space between a securing metal fitting and a core member of the polymer insulator.

According to the present invention, a method of detecting an overcoating rubber flowed in a space between a core member and a securing metal fitting of a polymer insulator having the core member, the overcoating arranged around the core member and the securing metal fitting fixed to at least one end of the core member, comprises the steps of: applying a torque in a circumferential direction to the securing metal fitting, after forming the overcoating rubber but before fixing the securing metal fitting to the core member; deforming an index provided on a surface of the overcoating; and detecting whether the overcoating rubber is existent or not in the space between the securing metal member and the core member in response to a deforming extent indicated by the index.

In the present invention, a torque is applied in a circumferential direction to the securing metal fitting, after forming the overcoating rubber but before fixing to the securing metal fitting to the core member. Therefore, the index provided on a surface of the overcoating, which is preferably the parting line generated on a surface of the overcoating during forming, is deformed, and thus it is possible to detect whether the overcoating rubber is existent or not in the space between the securing metal member and the core member in response to the deforming extent indicated by the index. In this detection method mentioned above, since it is not necessary to use so much equipment for detection and it is performed in an easy manner, it is possible to perform the detection of whether or not the overcoating is existent in the space between the core member and the securing metal fitting easily even in a manufacturing field.

Moreover, in a preferred embodiment if torques rotating in a reverse direction with each other are applied to the securing metal fittings, which are arranged at both ends of the core member, it is possible to detect the overcoating rubber simultaneously at both ends. Preferably, if the deforming extent indicated by the index is measured by detecting a deforming amount in a circumferential direction between two points on the parting line with a predetermined distance, one of which is preferably set at a position at which the parting line and the securing metal fitting are contacted, and defining the detected deforming amount between two points as the deforming extent indicated by the index, it is possible to measure the deforming extent correctly.

DESCRIPITION OF THE PREFERRED EMBODIMENT

Figure 1:
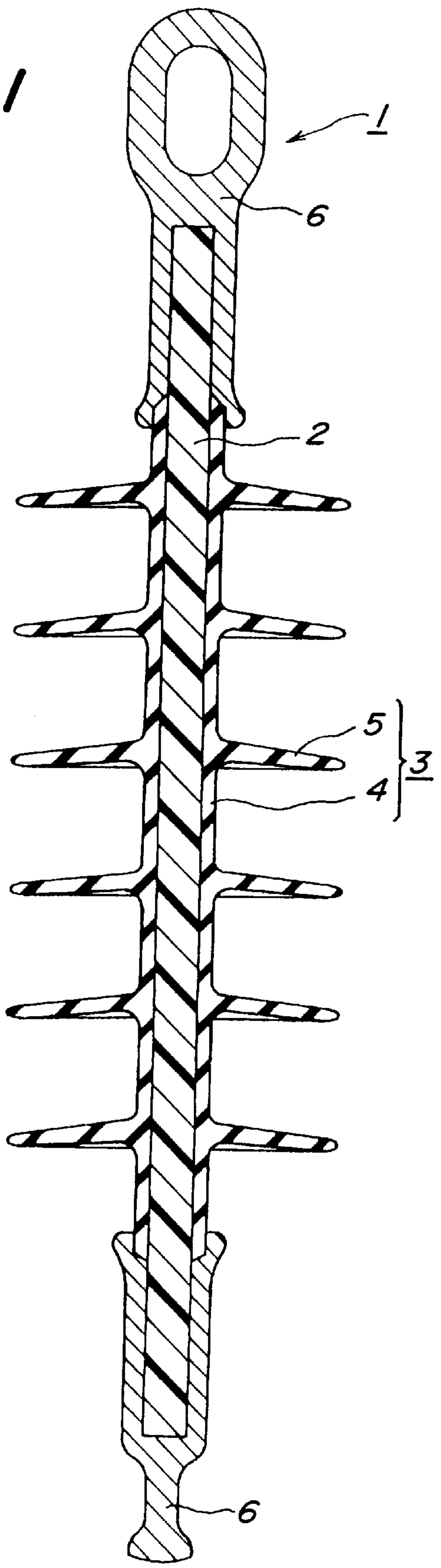
FIG. 1 is a schematic view showing one embodiment of a polymer insulator to which the present invention is applied.

FIG. 1 is a schematic view showing one embodiment of a polymer insulator to which the present invention is applied, the construction of which is known. In the embodiment shown in FIG. 1, a polymer insulator 1 comprises an FRP core 2 and an overcoating 3. Moreover, the overcoating 3 comprises an overcoating sheath 4 arranged on an overall outer surface of the FRP core 2, and sheds 5 projected from the overcoating sheath 4. Securing metal fittings 6 are arranged at both ends of the FRP core 2 by clamping, for example.

Figure 2A:
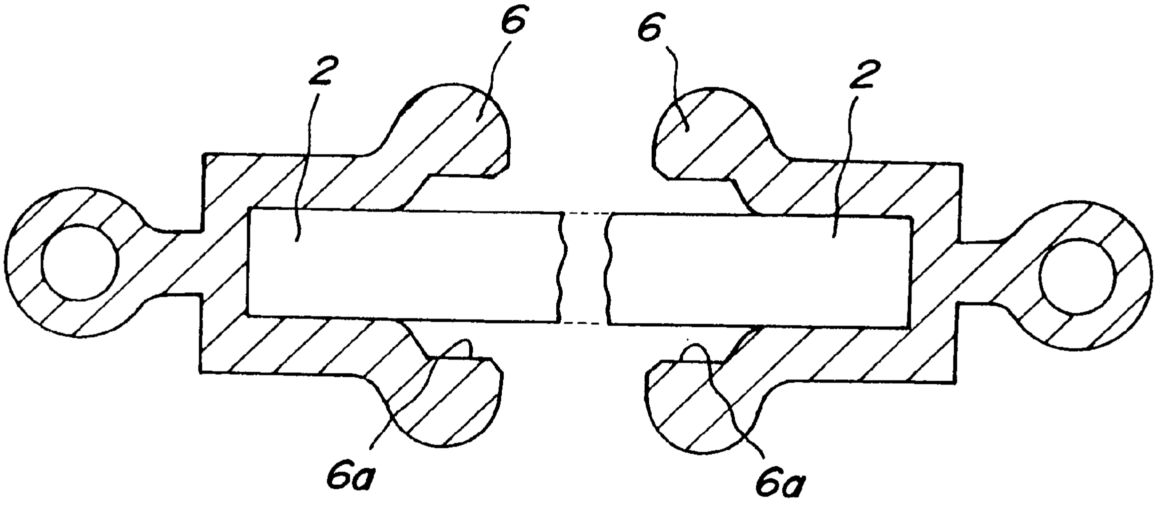
FIGS. 2*a* and 2*b* are schematic views respectively illustrating one manufacturing method of the polymer insulator shown in FIG. 1.
Figure 2B:
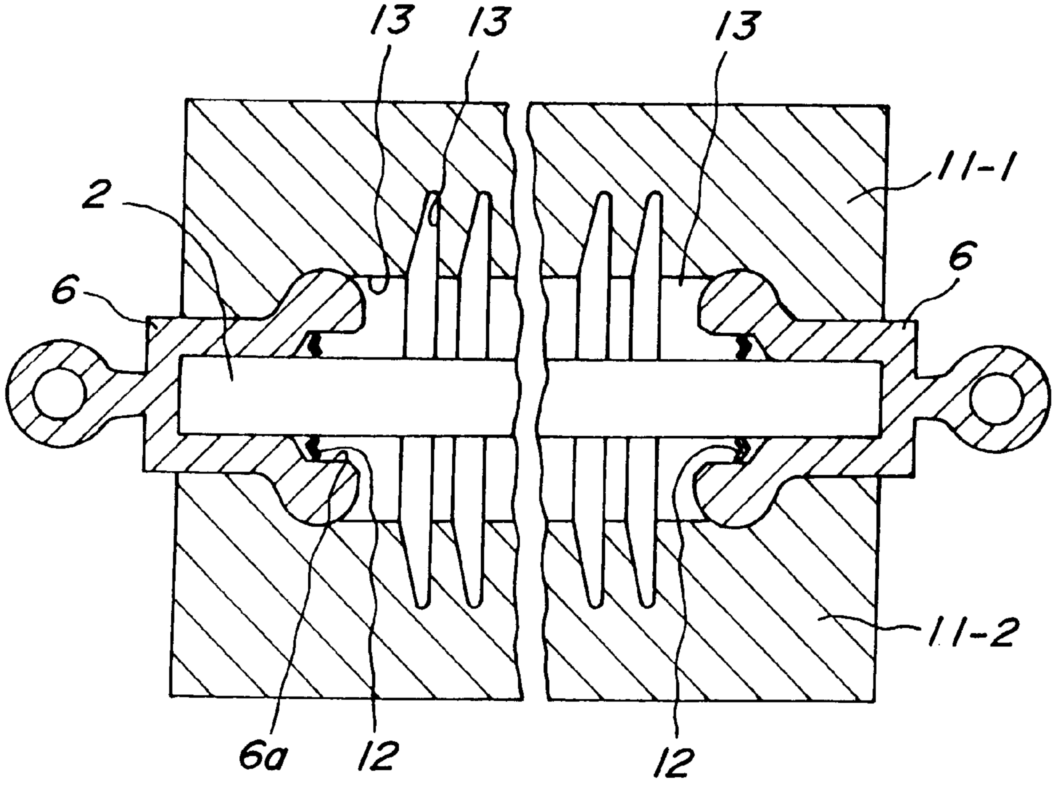

The polymer insulator having the construction shown in FIG. 1 to which the present invention is applied is manufactured as follows. At first, as shown in FIG. 2*a*, the securing metal fittings 6 are set to the both ends of the FRP core 2 in such a manner such that the securing metal fittings 6 are not clamped to both ends of the FRP core 2. Then, as shown in FIG. 2*b*, the FRP core 2 and the metal fittings 6 are set between metal molds 11-1 and 11-2 such that the metal molds 11-1 and 11-2 are closed. A packing member 12 made of a cylindrical member having a V-shape cross section is set between a large diameter portion 6*a* of the securing metal fitting 6 and the FRP core 2. Then, a mold forming is performed by filling an overcoating rubber (not shown) made of silicone rubber for instance in a cavity 13 formed in the metal molds 11-1 and 11-2, following by heating. Subsequently, the securing metal fittings 6 are clamped to the FRP core 2. Thus, it is possible to obtain a polymer insulator 1 in which a cured connection portion having excellent seal performance is arranged between the securing metal fitting 6 and the overcoating 3.

Figure 3:
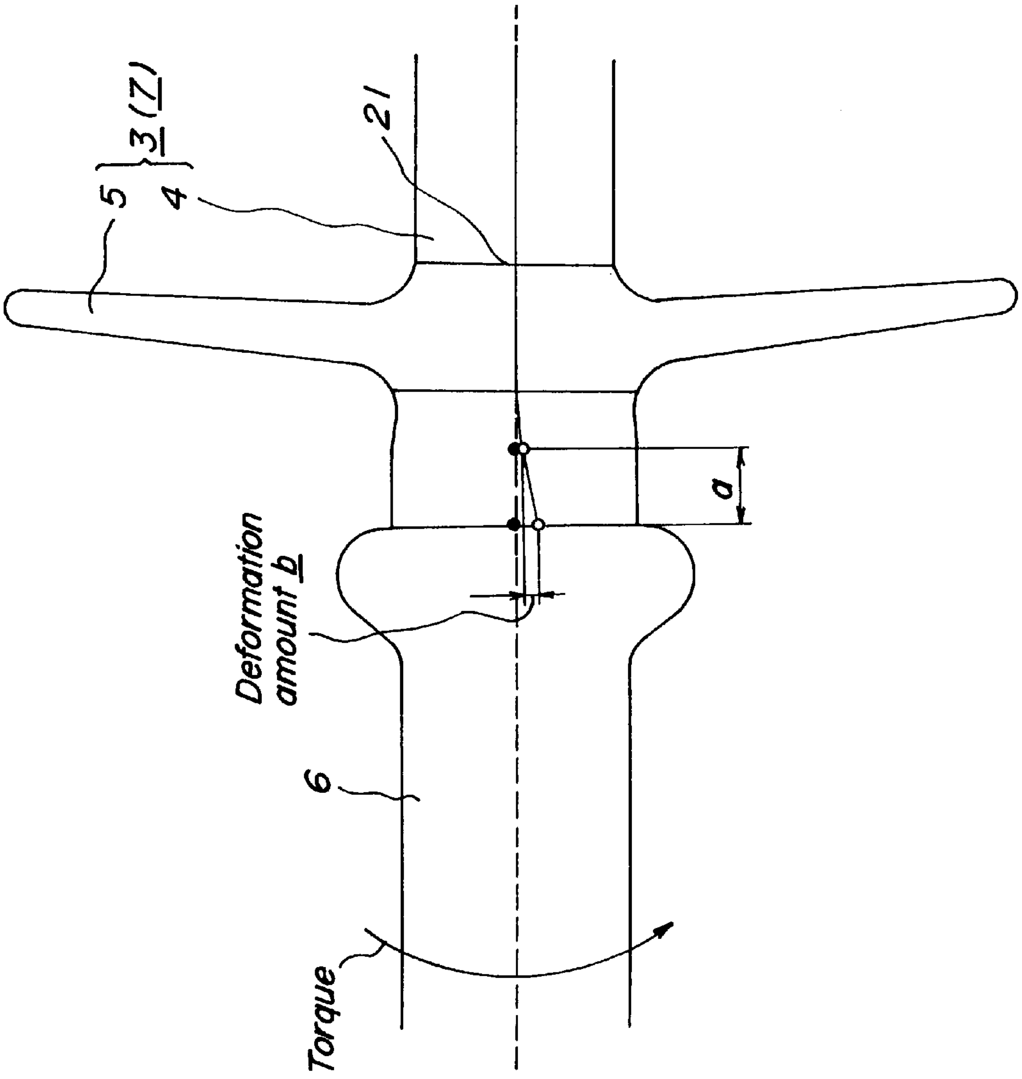
FIG. 3 is a schematic view for explaining a method of detecting an overcoating rubber flowed in a space between a core member and a securing metal fitting of the polymer insulator according to the invention.

In the polymer insulator 1 having the construction shown in FIG. 1, which is manufactured according to the method explained in FIG. 2, a detection method according to the invention is performed as follows. At first, as shown in FIG. 3, torques in a circumferential direction rotating in a reverse direction with each other are applied to the securing metal fittings 6 arranged at both ends of the FRP core 2, after forming an overcoating rubber 7 but before clamping the securing metal fittings 6 to the FRP core 2. It is a matter of course that a torque is applied only to the securing metal fitting 6 if the securing metal fitting 6 is set only to one end of the FRP core 2. Thereby, a parting line 21 along an axial direction of the FRP core 2 generated on a surface of the overcoating 3 during forming the overcoating rubber 7 is deformed, and the amount of deforming is measured.

Now, a preferred method of measuring a deforming amount b, of the parting line 21 will be explained with reference to FIG. 3. In this embodiment, a deforming amount in a circumferential direction is measured between two points on the parting line 21 with a predetermined distance a, along an axial direction of the FRP core 2, one of which is preferably set at a position at which the parting line 21 and the securing metal fitting 6 are contacted, and the detected deforming amount b, is defined as the extent of deforming in a circumferential direction.

Figure 4:
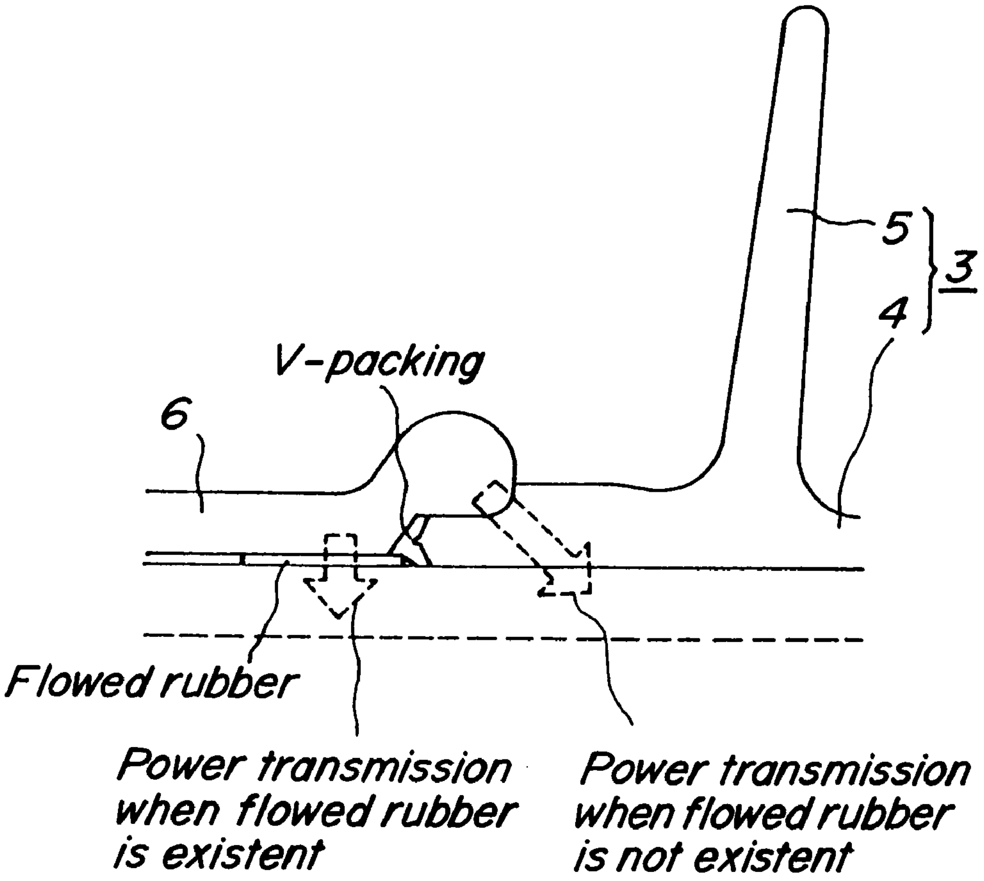
FIG. 4 is a schematic view for explaining a power transmitting in the detection method according to the invention.

In the method of detecting the overcoating rubber flowed in space between the core member and the securing metal member of the polymer insulator according to the present invention, the reason it can be known whether or not the overcoating rubber is existent in the space between the core member and the securing metal fitting by measuring the deforming amount b, of the parting line 21, is as follows. As shown in FIG. 4, in the event that overcoating rubber has not flowed into the space, a power is transmitted to the overcoating 3 through a curing connection portion between the large diameter portion 6*a* of the securing metal fitting 6 and the overcoating 3 and further to the FRP core 2, when a torque rotating in a circumferential direction is applied to the securing metal fitting 6. In this case, since the securing metal fitting 6 is not clamped to the FRP core 2, the securing metal fitting 6 and the FRP core 2 are rotated freely. Therefore, the overcoating 3 connected to the securing metal member 6 is twisted, and thus the parting line 21 is largely deformed. On the other hand, as shown in FIG. 4, in the event that the overcoating rubber has flowed into the space, a large amount of power is transmitted directly to the FRP core 2 from the securing metal fitting 6 through the flowed overcoating rubber, when a torque rotating in a circumferential direction is applied to the securing metal fitting 6, since the FRP core 2 and the securing metal fitting 6 is connected by the flowed overcoating rubber. In this case, the securing metal fitting 6 is difficult to move in a circumferential direction even if the torque is applied thereto.

Therefore, the overcoating 3, i.e., the parting line 21 is difficult to deform. Thus, it is possible to detect whether or not the overcoating rubber is existent in the space between the FRP core 2 and the securing metal fitting 6 by measuring the deforming amount b, of the parting line 21 in the event that a predetermined torque is applied to the securing metal fitting 6, and comparing the detected deforming amount with a predetermined thresh-hold deforming amount.

Hereinafter, actual experiments will be explained.

Experiment 1

At first, it was examined whether or not the deformation of the cured connection portion between the securing metal fitting 6 and the overcoating 3 by applying a torque to the securing metal fitting 6 was affected for seal performance at the cured connection portion mentioned above in the polymer insulator. This is a preamble for performing the method of detecting the overcoating rubber flowed in the space between the core member and the securing metal fitting of the polymer insulator according to the invention. The polymer insulator, in which the overcoating rubber 7 is formed but the securing metal fitting 6 is not clamped, was manufactured according to the manufacturing method mentioned above. Then, torques of 1.0 kg·fm rotating in a reverse direction with each other were applied respectively to the securing metal fittings 6 arranged at both ends of the thus prepared polymer insulator 1, in order to simulate operations of the detection method according to the invention. Subsequently, the securing metal fittings 6 arranged at both ends of the polymer insulator 1 were immersed in a fuchsine solution for one hour to which a pressure of 150 kgf/$cm^2$ was applied. Then, the securing metal fittings 6 were cut to examine whether or not an immersion of fuchsine solution at the cured connection portion between the securing metal fitting 6 and the overcoating 3 was existent. As a result, in all the sixteen samples, it was confirmed that the seal performance of the cured connection portion of the polymer insulator 1 was not affected even if the cured connection portion was deformed by applying a torque to the securing metal fitting 6.

Experiment 2

Figure 5:
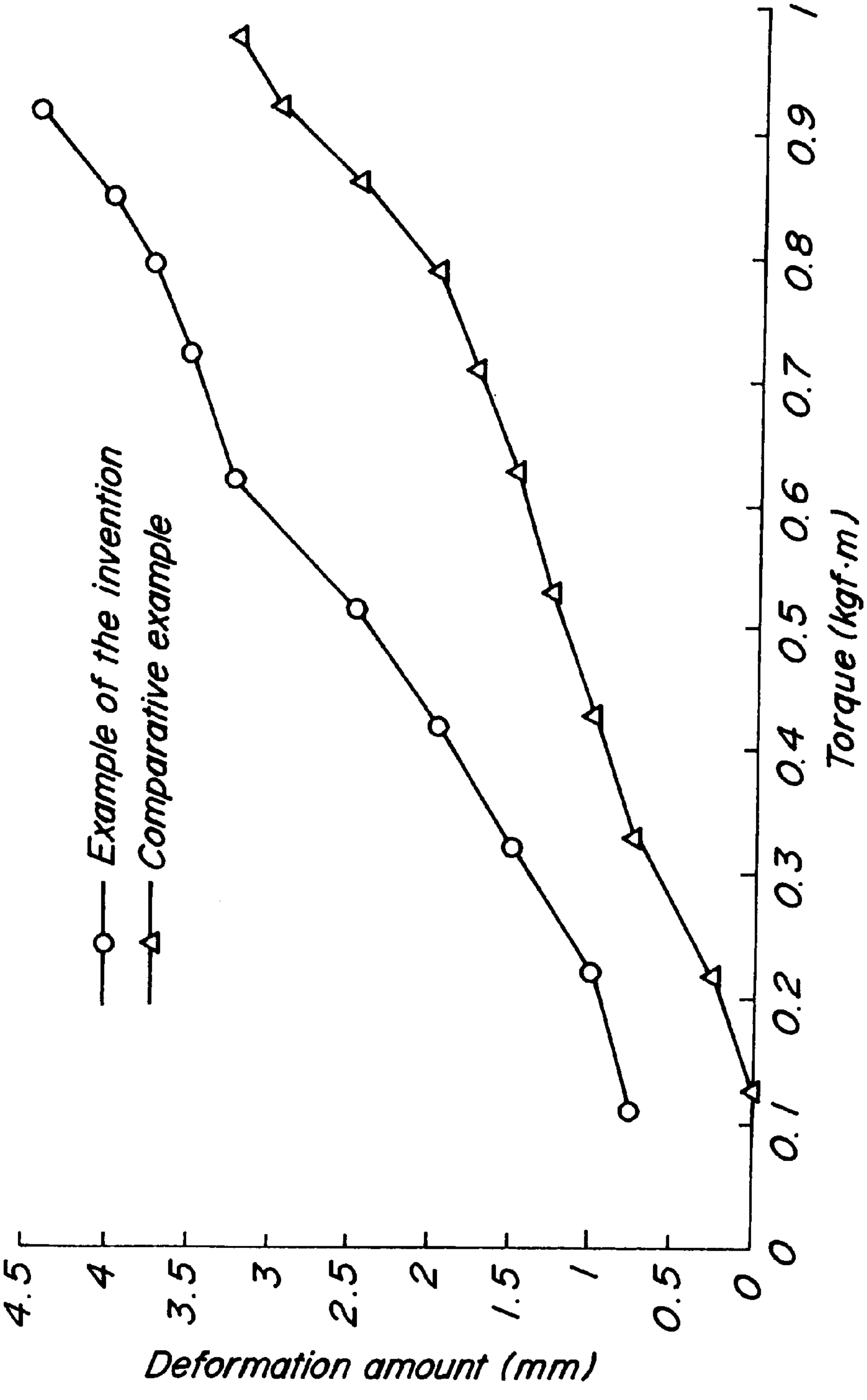
FIG. 5 is a graph showing a relation between torque and deforming extent in the example of the present invention and in the comparative example.

Next, an example of the invention and a comparative example were prepared. In the example of the invention, the overcoating rubber 7 was not flowed into the space between the securing metal fitting 6 and the FRP core 2 during forming. In the comparative example, the overcoating rubber 7 was flowed into the space between the securing metal fitting 6 and the FRP core 2 furring forming. Both in the example of the invention and the comparative example, the deformation extent was measured when a torque applied to the securing metal fitting 6 was varied. The deformation extent was measured from the deformation amount b between two points where the distance a was set to 20 mm in FIG. 3. The result is shown in FIG. 5. In FIG. 5, the example of the invention is largely different from the comparative example on the deformation amount. Therefore, it was confirmed that it is possible to detect whether or not the overcoating rubber is existent in the space between the securing metal fitting and the core member by using a thresh-hold value, if a relation between torque and deformation amount is preliminarily measured for the polymer insulator having the same specification and the thresh-hold value at which the overcoating rubber starts to flow in the space between the securing metal fitting and the core member is determined.

The present invention is not limited to the embodiments mentioned above, and various modifications can be possible. For example, in the embodiment mentioned above, the parting line generated during forming is used as the index provided on a surface of the overcoating, but it is a matter of course that other means, such as a line drawing along an axial direction of the polymer insulator on a surface of the overcoating, can be used as the index.

As clearly understood from the above explanations, according to the invention, a torque is applied in a circumferential direction to the securing metal fitting, after forming the overcoating rubber but before fixing to the securing metal fitting to the core member. Therefore, the index provided on a surface of the overcoating, which is preferably the parting line generated on a surface of the overcoating during forming, is deformed, and thus it is possible to detect whether the overcoating rubber is existent or not in the space between the securing metal member and the core member in response to the deforming extent indicated by the index. In this detection method mentioned above, since it is not necessary to use so much equipment for detection and can be performed in an easy manner, it is possible to perform the detection whether or not the overcoating is existent in the space between the core member and the securing metal fitting easily, even in a manufacturing field. Moreover, if torques rotating in a reverse direction with each other are applied to the securing metal fittings which are arranged at both ends of the core member, it is possible to detect the overcoating rubber simultaneously at both ends. Further, if the deforming extent indicated by the index is measured by detecting a deforming amount in a circumferential direction between two points on the parting line with a predetermined distance, one of which is preferably set at a position at which the parting line and the securing metal fitting are contacted, and defining the detected deforming amount between two points as the deforming extent indicated by the index, it is possible to accurately measure the deforming extent.

What is claimed is:

1. A method of detecting an overcoating rubber flowed in a space between a core member and a securing metal fitting of a polymer insulator having the core member, the overcoating arranged around the core member and the securing metal fitting fixed to at least one end of the core member, comprising the steps of:

applying a torque in a circumferential direction to the securing metal fitting, after forming the overcoating rubber but before fixing the securing metal fitting to the core member;

deforming an index provided on a surface of the overcoating; and detecting whether the overcoating rubber is existent or not in the space between the securing metal member and the core member in response to a deforming extent indicated by the index.

2. The method according to claim 1, wherein the index is a parting line along an axial direction of the core member generated on a surface of the overcoating during forming.

3. The method according to claim 1, wherein torques rotating in a reverse direction with each other are applied to the securing metal fittings arranged at both ends of the core member, respectively.

4. The method according to claim 2, wherein the deforming extent indicated by the index is measured by detecting a deforming amount in a circumferential direction between two points defined on the parting line with a predetermined distance, and defining the detected deforming amount between two points as the deforming extent indicated by the index.

5. The method according to claim 4, wherein one of the two points used for measuring the deforming extent is set at a position at which the parting line and the securing metal fitting are contacted.

* * * * *